(12) United States Patent
Lee et al.

(10) Patent No.: US 9,756,233 B2
(45) Date of Patent: Sep. 5, 2017

(54) BARRIER OPERATOR CONTROL OF A CAMERA

(71) Applicant: The Chamberlain Group, Inc., Elmhurst, IL (US)

(72) Inventors: Jonathan Arnold Lee, LaGrange, IL (US); Y. Kevin Yeh, Elmhurst, IL (US); James J. Fitzgibbon, Batavia, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 19 days.

(21) Appl. No.: 14/669,595

(22) Filed: Mar. 26, 2015

(65) Prior Publication Data

US 2015/0281658 A1 Oct. 1, 2015

Related U.S. Application Data

(60) Provisional application No. 61/971,260, filed on Mar. 27, 2014.

(51) Int. Cl.
*H04N 5/232* (2006.01)
*G08B 13/08* (2006.01)
*H04N 7/18* (2006.01)

(52) U.S. Cl.
CPC ......... *H04N 5/23203* (2013.01); *G08B 13/08* (2013.01); *H04N 5/23206* (2013.01); *H04N 7/181* (2013.01); *H04N 7/183* (2013.01); *H04N 7/188* (2013.01)

(58) Field of Classification Search
CPC ...... H04N 7/18–7/188; H04N 5/23203; H04N 5/23206; G08B 13/08; G08B 13/196–13/19697; G07C 2009/00928; E05F 1/00–1/16; E05F 3/00; E05F 15/00–15/79; E05Y 2900/106; E05Y 2900/108; E05Y 2900/40–2900/404
See application file for complete search history.

(56) References Cited

U.S. PATENT DOCUMENTS

| 4,360,807 | A | 11/1982 | Zettergren |
| 4,464,651 | A | 8/1984 | Duhame |
| 6,025,785 | A | 2/2000 | Farris |
| 7,113,090 | B1 | 9/2006 | Saylor |
| 7,193,644 | B2 | 3/2007 | Carter |
| 7,205,892 | B2 | 4/2007 | Luebke |
| 7,468,676 | B2 | 12/2008 | Styers |

(Continued)

OTHER PUBLICATIONS

PCT Application No. PCT/US15/22742; International Search Report and Written Opinion Dated Jul. 10, 2015.

*Primary Examiner* — Paul Berardesca
(74) *Attorney, Agent, or Firm* — Fitch Even Tabin & Flannery LLP

(57) ABSTRACT

A barrier operator that controls operation of a camera includes a controller, a communication module, and control circuitry. The controller moves a barrier between open and closed positions. The communication module receives open/close commands from a peripheral device. The control circuitry is in communication with the controller, the communication module, and a camera. The control circuitry of the barrier operator automatically activates the camera to capture at least one visual image in response to receiving an open/close command and/or a determination to move the barrier.

27 Claims, 8 Drawing Sheets

(56) References Cited

U.S. PATENT DOCUMENTS

| | | |
|---|---|---|
| 7,532,709 B2 | 5/2009 | Styers |
| 7,602,283 B2 | 10/2009 | John |
| 7,710,284 B2 | 5/2010 | Dzurko |
| 7,869,582 B2 | 1/2011 | Styers |
| 8,139,098 B2 | 3/2012 | Carter |
| 8,144,183 B2 | 3/2012 | Carter |
| 8,144,184 B2 | 3/2012 | Carter |
| 8,154,581 B2 | 4/2012 | Carter |
| 8,164,614 B2 | 4/2012 | Carter |
| 8,218,739 B2 | 7/2012 | Styers |
| 8,345,846 B2 | 1/2013 | Nassimi |
| 8,410,930 B2 | 4/2013 | Karasek |
| 8,780,201 B1 | 7/2014 | Scalisi |
| D711,275 S | 8/2014 | Scalisi |
| 8,823,795 B1 | 9/2014 | Scalisi |
| 8,842,180 B1 | 9/2014 | Kasmir |
| 8,872,915 B1 | 10/2014 | Scalisi |
| 8,937,659 B1 | 1/2015 | Scalisi |
| 2003/0071590 A1 | 4/2003 | Roman |
| 2003/0140107 A1 | 7/2003 | Rezvani |
| 2004/0212498 A1 | 10/2004 | Peterson |
| 2007/0103541 A1 | 5/2007 | Carter |
| 2007/0103542 A1 | 5/2007 | Carter |
| 2007/0103548 A1 | 5/2007 | Carter |
| 2008/0062000 A1* | 3/2008 | Styers ............ G05B 9/02 340/686.1 |
| 2008/0079562 A1 | 4/2008 | Gioia |
| 2008/0079810 A1 | 4/2008 | Fitzgibbon |
| 2008/0117299 A1 | 5/2008 | Carter |
| 2011/0254685 A1* | 10/2011 | Karasek ............ E05F 15/74 340/540 |
| 2012/0262581 A1 | 10/2012 | Carter |
| 2013/0057695 A1 | 3/2013 | Huisking |
| 2014/0125499 A1 | 5/2014 | Cate |
| 2015/0029335 A1 | 1/2015 | Kasmir |
| 2015/0222852 A1 | 8/2015 | Carter |

\* cited by examiner

BARRIER OPERATOR CONTROL OF A CAMERA

RELATED APPLICATIONS

This application claims the benefit of U.S. provisional application No. 61/971,260 filed Mar. 27, 2014, titled "Barrier Operator Control of Associated Camera," which is incorporated by reference in its entirety herein.

TECHNICAL FIELD

The present disclosure generally relates to movable barrier operators. More specifically, the present disclosure relates to moveable barrier operators that exhibit control over cameras.

BACKGROUND

Security cameras are used to record video or photographic images around a residential or commercial location. Security cameras can be positioned within or about the perimeter of a home entrance to obtain, record, and/or present images to a user. Some security cameras can be controlled via a security system that can be accessed and operated remotely. In this manner, users may be able to access an interface of the security system with a smart phone to view images obtained by the security camera. However, it may not always be efficient to have a camera continuously operating and capturing images. In some situations, it may be efficient to activate a security camera only in situations where a heightened security risk is detected.

Cameras have been used to activate a barrier operator. Other systems allow viewing of the garage from a cell phone. These systems do not receive information from the barrier operator but instead measure the door position, which limits the information received. Moreover, these systems do not automatically activate a camera to obtain images in situations where a heightened security risk is detected.

SUMMARY

Certain embodiments presented herein describe a barrier operator that controls operation of a camera. The barrier operator comprises a controller that moves a barrier between open and closed positions (for example, to open or partially open the barrier, or to close or partially close the barrier). The barrier operator also includes a communication module that receives communications from one or more peripheral devices (for example, sensors, wall switches, remote controls, an internet router, user operated devices, etc.), where at least one of the communications includes an open/close command. The barrier operator also includes control circuitry that is in communication with the controller, the communication module, and the camera. In response to the communication module receiving an open/close command, the control circuit sends an open/close instruction to the controller that activates the controller to move the barrier, and automatically sends a capture instruction to the camera that activates the camera to capture at least one visual image. Optionally, capture instructions can also be generated in response to the activation of certain features of the barrier operator, such as the activation of a light source associated with the barrier operator. Such a feature may be activated, for example, in response to an object detection sensor detecting an object in the path of an open barrier (for example, via an interruption of the photobeam at the entrance of an open garage).

Some embodiments describe a system that includes one or more cameras and a housing. The camera obtains visual images (for example, still images, video images, etc.), and the housing includes the barrier operator components (for example, the controller, the communication module, and the control circuit) described above. The camera can be integrated as a part of the housing or positioned remote to the housing. In response to the communication module receiving an open/close command from a peripheral device, the control circuit sends an open/close instruction that activates the controller to move the barrier between open and closed positions and automatically sends a capture instruction that activates the camera to capture at least one visual image. The control circuit and communication module also operate to send visual images captured by the camera to a user operated peripheral device (for example, a computer or a smart phone).

Some approaches relate to a method for operating a barrier operator to capture visual images with a camera. The method includes receiving a communication that includes an open/close command at the barrier operator (for example, via a communication module). In response to receiving the open/close command, the barrier operator both effects movement of the barrier (for example, opens or closes the barrier), and sends a capture instruction to a camera that activates the camera to capture at least one visual image. The barrier operator then receives visual images captured by the camera, and potentially transmits those images to a user operated peripheral device (for example, via the internet).

So configured, the system need not rely on a user to determine when to activate the camera. Nor does the system rely on sensors external to the camera or barrier operator that may fail to properly activate the camera. A majority of security events for which a user may want video is when the barrier is moving or when the operator receives a command to move the barrier, and the barrier operator knows when it receives such a command or is about to move the barrier. Thus, the barrier operator can activate the camera immediately before or in coordination with attempting to move the barrier such that visual data is automatically recorded during such critical time periods after barrier movement without reliance on an activation signal from the user or other separate sensing device. Such captured images can be automatically sent immediately to a user, stored for later viewing, and/or automatically sent to a user based on other conditions.

DETAILED DESCRIPTION

Generally speaking, the present disclosure presents systems and methods that activate a camera (e.g., a security camera) to capture visual images in response to receiving a command or making a determination to open, close, or otherwise move a barrier with a barrier operator. Such commands can be received from a peripheral device (including a user operated peripheral device), or they can result from other conditions or events, such as safety reversal conditions, or the detection of certain barrier operator status conditions. Additionally and/or alternatively, the camera can be activated in response to the barrier operator receiving information from sensors or detectors, for example, information pertaining to the detection of motion within the garage from a motion sensor affiliated with the barrier operator.

A barrier operator is a device or system that controls movement of movable barriers, such as gates, doors, barricades, or other closures that restrict access to certain property. Examples of such barrier operators can include gate operators, rolling shutter operators, garage door operators, and the like.

In a simple form, a barrier operator can include a controller (which can include a motor) connected to barrier and control circuit. In some cases, the barrier operator also includes a communication module that receives barrier movement commands from remote or peripheral devices. Such commands can serve, for example, to prompt the controller to responsively move the barrier from a closed position to an opened position or vice versa.

The presently disclosed barrier operators operate in association with one or more cameras that capture visual images. For example, the disclosed barrier operators send signals or otherwise activate an associated camera(s) to capture visual images when the barrier operators receive commands to open, close, or otherwise move a barrier. In this manner, the described barrier operators can control an associated camera so that the camera captures visual images when the barrier operator is moving the barrier between open and closed positions or tries to move the barrier. For instance, a user trying to close a barrier may want to review video captured at the barrier if the barrier will not close to determine whether an obstacle is present. In another example, a homeowner may wish to view images if the barrier opens in a situation where no residents are expected to be at home (for example, where a child runs home to retrieve a forgotten item after initially departing for school).

Figure 1:
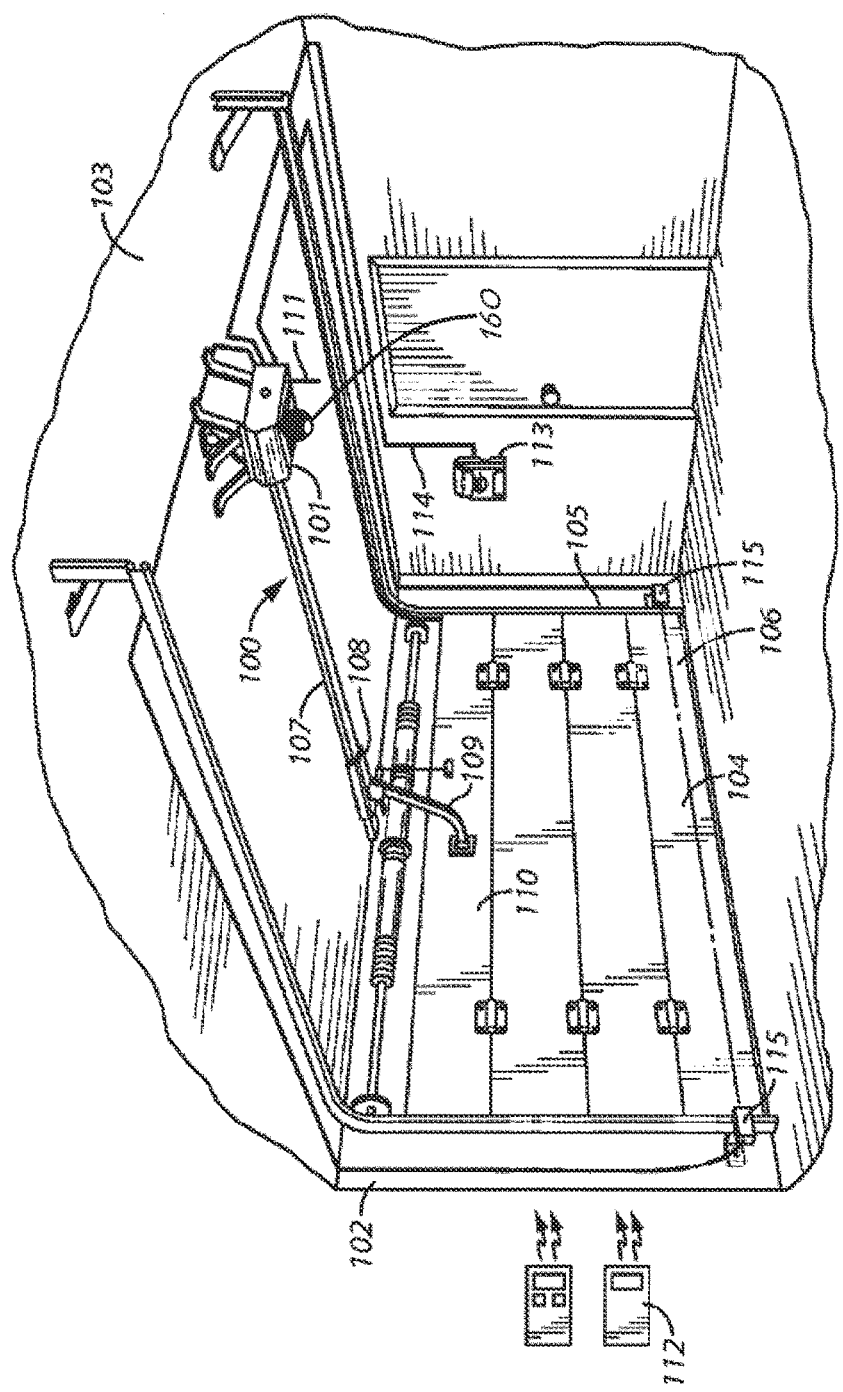
FIG. 1 presents a perspective view of a barrier operator and camera system in accordance with various embodiments of the present disclosure.

In yet another example, a homeowner may wish to view images where the barrier operator receives conflicting commands (for example, where a homeowner's remote sends a close signal to close the barrier, but a separate user presses a button on the wall control unit causing the barrier operator to reverse). Various other use scenarios can be envisioned FIG. 1 presents an illustrative application setting for a camera controlling barrier operator. It will be understood that the specifics of this example are intended to serve only in an illustrative regard and are not intended to express or suggest any corresponding limitations with respect to the scope of these teachings.

In FIG. 1, a camera controlling barrier operator 100 is installed in a garage 102. In this example, the barrier operator 100 is a garage door system that is configured to move a barrier 104 (shown as a garage door) between open and closed positions to provide or restrict access to the garage 102. This barrier operator 100 includes a head unit 101 that includes a housing.

The head unit 101 mounts to the garage ceiling 103 and serves to control and effect selective movement of a multi-panel garage door barrier 104. The garage door barrier 104 includes a plurality of rollers (not shown) rotatably confined within a pair of tracks 105 positioned adjacent to and on opposite sides of the garage opening 106. The head unit 101 can be powered from a power supply (not shown).

The head unit 101 includes a controller, which has a motor (not shown in FIG. 1) that provides motion to the garage door barrier 104 via a rail assembly 107. The rail assembly 107 includes a trolley 108 for releasable connection of the head unit to the garage door barrier 104 via an arm 109. The arm 109 connects to an upper portion 110 of the garage door barrier 104. The trolley 108 connects to an endless chain (or belt or the like, not shown) that effects the desired movement of the trolley 108, and hence the barrier 104, via the arm 109. This chain can be driven by a sprocket (not shown) that couples to the aforementioned motor in the head unit.

The head unit 101 can also include a communication module (not shown in FIG. 1), which can include a radio frequency receiver having an antenna 111, to facilitate receiving communications from one or more peripheral devices. In some examples, the communications can be coded radio frequency transmissions, and the peripheral devices can be one or more remote controls 112. The remote controls 112 can be transmitters, and can include personally-portable transmitters (such as keyfob-style transmitters) or mobile-installed keypad transmitters (such as those often installed in automobile sun visors or headliners) as well as remotely-located non-mobile keypad transmitters (as are sometimes mounted on a wall within, for example, a garage or outside the garage on a nearby wall or framing member). The communication module can connect to a processor or control circuit (not shown) in the head unit 101, which can interpret received signals and responsively controls other portions of the barrier operator 100.

In some examples, the head unit 101 can also communicate with other peripheral devices, which can send commands or other communications to the barrier operator 100, for example, through the communication module. The other peripheral devices can include user operated peripheral devices, such as mobile devices or computers operating a user interface that facilitates interaction with the barrier operator 100, or a router or other network hub that provides access to the Internet or other networks to the barrier operator 100, for example.

In certain embodiments, the peripheral devices can communicate commands to the barrier operator, such as open/close commands that cause the barrier operator 100 to effect movement of the barrier 104 between open and closed positions. In one example, a peripheral device includes a wall control unit 113, which can communicate, for example, over a line 114 with the head unit 101.

In some embodiments, the wall control unit 113 can communicate with the head unit wirelessly, for example, via a radio frequency communication signal. The wall control unit 113 can send open/close commands that effect control of the barrier operator 100 motor. The wall control unit 113 can also send other communications that control other components of the barrier operator 100 or components in communication with the barrier operator 100 (such as a light). In some examples, the wall control unit 113 can include a visual display that provides an interface capable of displaying visual images. Though shown to be in the garage 102 in FIG. 1, it is contemplated that a wall control unit 113 can be located in other locations, for example, in locations throughout a home or residence associated with the garage 102. In some examples, the garage 102 and/or the associated home or residence can include multiple wall control units 113, each of which can operate or otherwise communicate with the barrier operator 100.

In other examples, the barrier operator 100 can communicate with peripheral devices that include sensors or detectors such as smoke detectors, carbon monoxide detectors, carbon dioxide detectors, timers, temperature sensors, motion sensors, sound sensors (e.g., glass breakage sensors), window or door opening sensors, or the like.

The sensors can communicate with the barrier operator 100 to control operation of the barrier operator 100. For example, the sensors may send information regarding their individual statuses to the barrier operator. In another example, the sensors can communicate open/close commands that effect movement of the barrier 104, light control commands that effect turning on or off an associated light, or other commands that trigger the barrier operator 100 to stop or reverse operation of a given task.

In the illustrative example of FIG. 1, the barrier operator 100 is in communication with sensor 115, which is an obstacle detector. The obstacle detector sensor 115 can operate optically or via an infrared-pulsed beam detect events, such as when the garage door opening 106 is blocked while the barrier 104 is opening or closing, for example. In the detection of such an event, the aforementioned control circuit can then, for example, cause a closing barrier 104 to reverse or open to avoid contact with the obstacle.

The barrier operator 100 can also include, or be in communication with, a camera 160. Camera 160 can be a security camera capable of capturing visual images. As used throughout this application, the terms "visual images" or "images" include still images, video images, or a combination thereof. In some examples, the camera 160 can also capture audio (which may accompany captured video, for example), and other information typically obtained by cameras such as time and date stamps and identification tags.

As shown in FIG. 1, the camera 160 can be attached to, or even be a component of the barrier operator 100. For example, the camera 160 can be integrated within, or attached to the housing of the head unit 101. In other examples, as explained in more detail with reference to FIGS. 2-4, the camera can be remote from, but in communication with, the barrier operator 100. In this manner, the camera 160 can be mounted in various locations throughout or even outside the garage 102, and directed to capture images from a certain location and angle. In such examples, the camera 160 can be connected to the barrier operator via a wired connection or a wireless connection, such that the barrier operator 100 can still control and activate the camera 160 to capture visual images.

Figure 8:
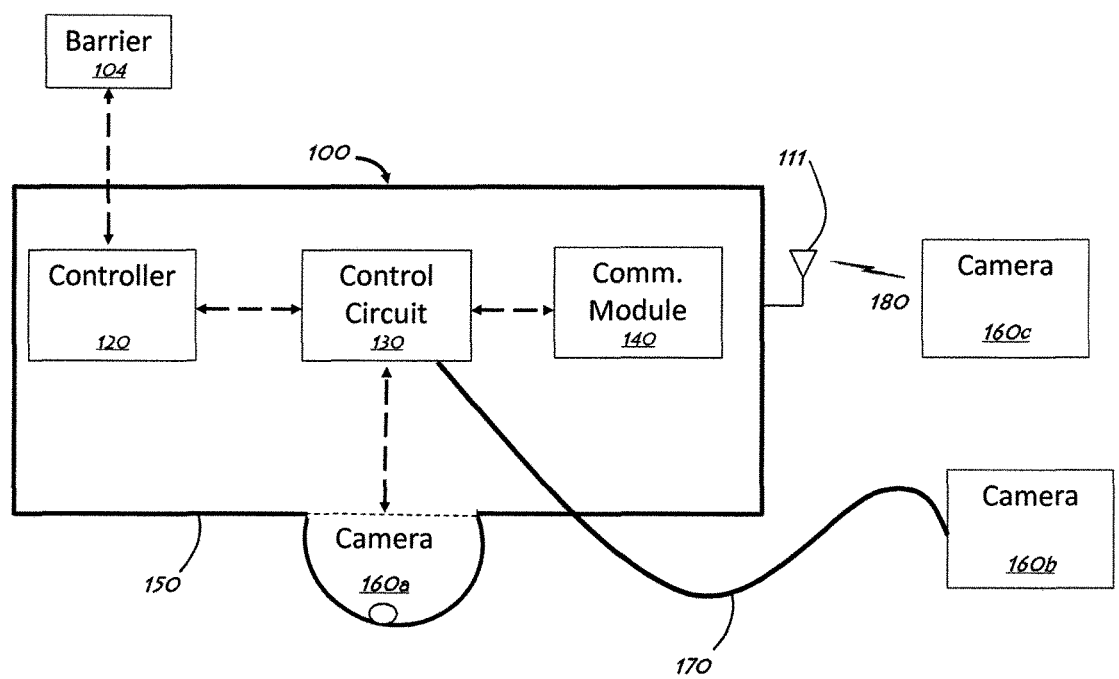
FIG. 8 is a block diagram showing a barrier operator associated with a plurality of cameras housing in accordance with at least one example of the present disclosure.

In some examples, as shown in FIG. 8, the barrier operator 100 can include, or be in communication with more than one camera, e.g., 160*a*, 160*b*, and 160*c*. In this manner, multiple cameras can be positioned throughout the garage to capture images of more than one location or from more than one vantage point.

The teachings set forth herein can be carried out, in one approach, by implementing a platform that is operated by the barrier operator 100 itself. For example, the barrier operator 100 can include a controller that controls movement of the barrier, a communication module that communicates with one or more peripheral devices and a camera, and a control circuit or processor that controls operation of the controller and the camera.

Figure 2:
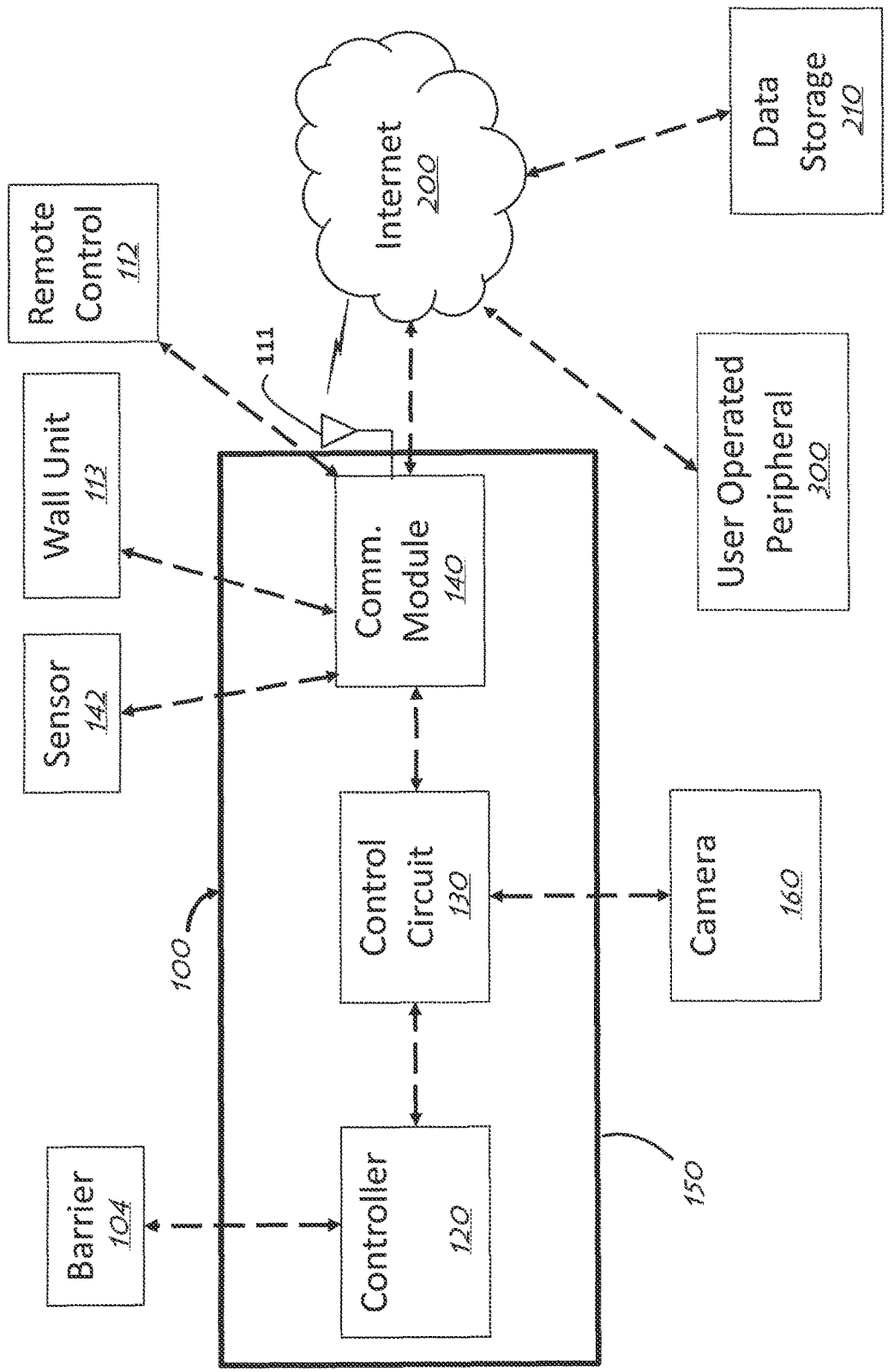
FIG. 2 is a block diagram showing an example interaction among various components of a barrier operator and camera system.

FIG. 2 is a block diagram showing an example of components of a camera controlling barrier operator 100 and the interaction of those components with a camera 160, a barrier 104, and other peripheral devices. The barrier operator 100 includes a housing 150. Within the housing are a controller 120, a control circuit 130, and a communication module 140.

The controller 120 controls movement of a barrier 104, which can be, for example, a garage door. The controller 120 can include a motor or other mechanized device that drives movement of the barrier 104, via a rail assembly and chain, as described above.

Communication module 140 can be, for example, a wireless communication module that communicates with one or more peripheral devices. The communication module 140 can include an antenna 111, which can facilitate communication via radio frequency signals or other forms of wireless communication. The communication module 140 receives commands from peripheral devices, such as open/close commands intended to effect movement of the barrier 104 between open and closed positions.

The communication module 140 can also transmit communications and other signals to remote or peripheral devices. For example, the communication module 140 can transmit data or other information to user operated peripheral devices such as mobile devices or computers, via the internet. In various configurations, the communication module 140 can include multiple discrete modules or one integrated module to effect the communications described herein.

The communication module 140 can communicate with a variety of peripheral devices, including or more sensors 142, a wall unit 113, a remote control 112, an outdoor combination PIN pad (not shown), or an intercom device (not shown). The sensor 142, wall unit 113, and remote control 112 of FIG. 2 can correspond to those objects shown in FIG. 1 and described above, or they may take on other forms. For example, the communication module 140 can communicate with one or more sensors 142 that include the obstacle detector 115 described with respect to FIG. 1, or other sensors such as smoke detectors, carbon monoxide detectors, carbon dioxide detectors, timers, temperature sensors, motion sensors, sound sensors (e.g., glass breakage sensors), window or door opening sensors, and the like. The remote control 112 and the wall unit 113 can be, for example, control switches with a button that activates the barrier operator 100 to move the barrier 104 between open and closed positions when pressed.

The communication module 140 can also communicate with one or more user operated peripheral devices 300. The user operated peripheral device 300 can include an interface that allows the user to operate or control certain aspects of the barrier operator.

The user operated peripheral device 300 can include a wired device with an interface. An example of a wired interface can include a wall control input (e.g., wall unit 113), which can be directly or indirectly connected to the camera 160. In this example, the wall control input can include a serial communication allowing the camera to activate according to events detected by the barrier operator 100. Other serial interfaces can include, for example, a dedicated interface. The wall unit 113 can include a display and an interface that allows for the display of images captured by the camera 160.

The user operated peripheral device 300 can also include a wireless device with an interface. For example, the user operated peripheral device 300 can comprise a mobile communication device such as a smart phone or a tablet computer. In some examples, the user operated peripheral device 300 can comprise an audio and/or video device (e.g., a surveillance monitor or the like) that is capable of displaying sounds, images, and/or graphics. The user operated peripheral device 300 can communicate with the communication module 140 directly, for example, via a radio frequency communication, or indirectly, for example, through the Internet 200.

The user operated peripheral device 300 can also include a computer or a network of computers that can individually access a user interface that provides control capabilities to the device. The user operated peripheral device 300 can include, or can communicate through, a router or a network server (not shown) that allows the communication module 140 to communicate with other devices over the internet 200.

In some examples, the user operated peripheral device 300 can be, or can operate in cooperation with, an alarm system, a security system, a surveillance system, and/or a component or components thereof. For example, in addition to or instead of communicating directly with a user operated peripheral device 300, the barrier operator 100 can be configured to communicate with a computer, a router, a transceiver, a monitoring system, or other similar device that is a component of a home or business security system. In this manner, the barrier operator 100 will transmit notifications, visual images (including still and video images), and other information directly to the security system. The security system may then, in turn, route the notifications, visual images, and/or other information to a user operated peripheral device 300, such as a smart phone. Additionally and/or alternatively, the security system can also route the notifications, visual images, and/or other information to an emergency response or other monitoring entity, such as a fire department, a police department, or an alarm monitoring company. In this manner the barrier operator 100 can operate as a system or a component of a system that facilitates expediting contact with appropriate entities in emergency situations.

In some embodiments, the communication module 140 can communicate with a data storage device 210, or a data storage account, such as a cloud computing account over the Internet. In this manner, the communication module can store information, such as visual image files, on the data storage device 210 or account that can be accessed, for example, by the control circuit or by affiliated user operated peripheral devices 300.

The barrier operator 100 also includes a control circuit 130 within the housing 150, which control circuit 130 can be a processor or other processing device that is in communication with both the controller 120 and the communication module 140. The control circuit 130 can control operation of the controller 120, for example, by sending open/close instructions in response to the communication module 140 receiving open/close commands.

In one approach, the control circuit 130 can control the transmission of signals from the communication module 140, (e.g., signals regarding the status of the barrier operator 100) to peripheral devices. In some approaches, the control circuit 130 includes, or can operate in connection with, a memory device such as a hard drive or other data storage medium capable of storing digital files, such as visual images.

The control circuit 130 can also be in communication with a camera 160. In some approaches, the control circuit 130 will be in direct communication (e.g., via a wire or cable) with the camera 160, while in other approaches, the control circuit 130 will be in indirect communication with the camera 160, for example, via the communication module 140.

In one embodiment, the control circuit 130 sends instructions that operate the camera. For example, the control circuit can transmit capture instructions to the camera, where the capture instructions activate the camera to capture visual images (e.g., still images, video images, etc.).

The control circuit 130 can be configured so that it sends a capture instruction any time the controller 120 is moving the barrier 104. In other examples, the control circuit may only send a capture instruction when the controller 120 is opening the barrier 104, and not when closing the barrier 104. In such a situation, however, the control circuit 130 can be arranged to capture images while closing the barrier 104 when certain events are detected. For example, the control circuit 130 may be configured to send a capture instruction to the camera 160 when it recognizes a possible obstacle, thereby capturing images as the barrier 104 stops or reverses movement.

The control circuit 130 can also transmit control instructions to the camera 160 where the control instructions activate the camera to perform a variety of camera functions. For example, the control instructions can activate the camera 160 to initiate the recording of video, stop the recording of video, activate or deactivate an audio recording, capture a series of one or more still images, adjust the position, angle, or orientation of the camera 160 or camera lens (e.g., to provide a different vantage point of visual images captured by the camera 160), adjust the zoom of the camera 160 (e.g., zoom the camera lens in or out), adjust the flash settings of the camera 160, adjust the focus settings of the camera 160, adjust the level of detail or pixel size of images captured by the camera 160, or adjust image settings such as brightness, contrast, tint, or color tone of visual images captured by the camera 160.

The control circuit 130 can transmit the control instructions in response to the communication module 140 receiving control commands from a user operated peripheral device 300. Via these control commands, a user can remotely move or adjust the camera 160 to modify the visual images that the camera 160 captures. The control circuit 130 can save or store the visual images and other information captured by the camera, for example, in a storage device such as a hard drive or a data storage account.

The control circuit 130 and the communication module 140 operate to transmit the captured images, via the communication module 140, to a user operated peripheral device 300. For example, the control circuit 130 can automatically effect transmission of captured visual images from the camera 160 to a mobile device once the visual images are captured.

In one approach, the captured visual images pass through the control circuit. In another approach, the camera may communicate the captured visual images to a cloud based or other storage without passing through the control circuit or barrier operator in which case the barrier operator can communicate with the camera and/or such cloud-based services to effect the image transmission described herein.

By one approach, the control circuit 130 forwards visual images to a predetermined recipient via the Internet. This might comprise, for example, forwarding the images via email, a so-called "tweet," a Short Message Service (SMS) message, an Instant Message (IM), Push alerts, or the like. If desired, the aforementioned received instruction prompted at least on behalf of the predetermined recipient can be conveyed in a similar manner.

In one example, the control circuit 130 transmits captured visual images automatically to a user only in certain conditions or when certain events are detected. For example, the control circuit 130 may transmit images to a user operated peripheral device 300 only when the communication module receives an open/close command from a peripheral device that is associated with a particular identifier. In such an example, the control circuit 130 may transmit the captured visual images (along with other information) to a user operated peripheral device 300 when the communication module 140 receives a command to open/close the barrier 104 from a remote control that is associated with a particular user (e.g., a child) or from an outdoor PIN pad or intercom device or when the communication module 140 receives a command to open/close the barrier 104 during a particular window of time (e.g., between midnight and 6 a.m.). In this manner, the barrier operator 100 can serve as an alert warning system that only automatically transmits visual images to a peripheral device in certain conditions, for example, conditions that may be of a particular interest to a homeowner.

In some examples, the control circuit 130 will transmit a notification, via the communication module 140, to a peripheral device prior to transmitting the visual images. The notifications can be, for example, in the form of a text message sent to a particular user operated peripheral device that notifies the user of the particular activity or event. For example, a user can receive a notification that a garage door has been opened. In response, the user can elect to receive, or not receive the images captured by the camera 160. For example, the user could call up a web browser or other application to retrieve and view the images if desired.

In some examples, the control circuit 130 operates with the communication module 140 to transmit other information to a peripheral device along with the notifications and/or visual images. For example, the control circuit 130 may transmit information pertaining to the device used to trigger opening/closing of the barrier (e.g., the wall unit, a remote control associated with a particular vehicle, an activated motion sensor, etc.), the time and date that the barrier was moved, the temperature, and/or other conditions within the garage. As an example, information can be sent from the communication module and received by an alarm system allowing interaction between the alarm system and the operator.

By one approach, the control circuit operably couples to a camera. This camera, in turn, serves to capture the aforementioned recently-captured image. As one example in these regards, the recently-captured image comprises an image of at least a portion of the barrier 104 that corresponds to the controller 120. So configured, this recently-captured image can serve to depict whether the barrier 104 is in a closed or open position.

As discussed previously, the camera 160 can be separate from the barrier operator 100, or be integrated as a component of the barrier operator 100. That is, the camera 160 can a separate component that mounts in a position away from the housing 150 of the barrier operator 100, or alternatively, the camera 160 can be located within, or integrated into the housing 150, as shown in FIG. 8 with respect to integrated camera 160a.

Figure 3:
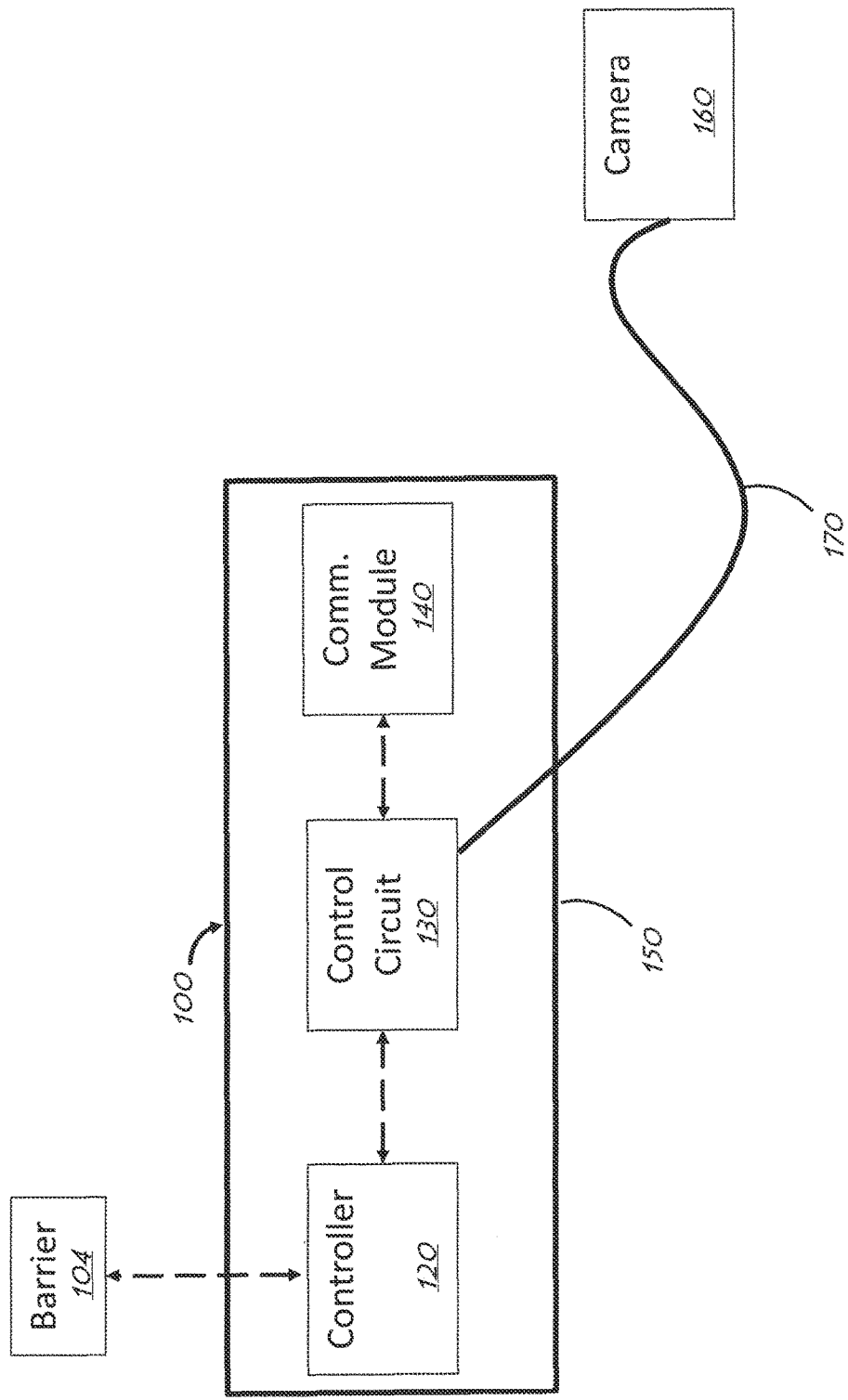
FIG. 3 is a block diagram showing an example of a barrier operator in a wired connection with an associated camera.
Figure 4:
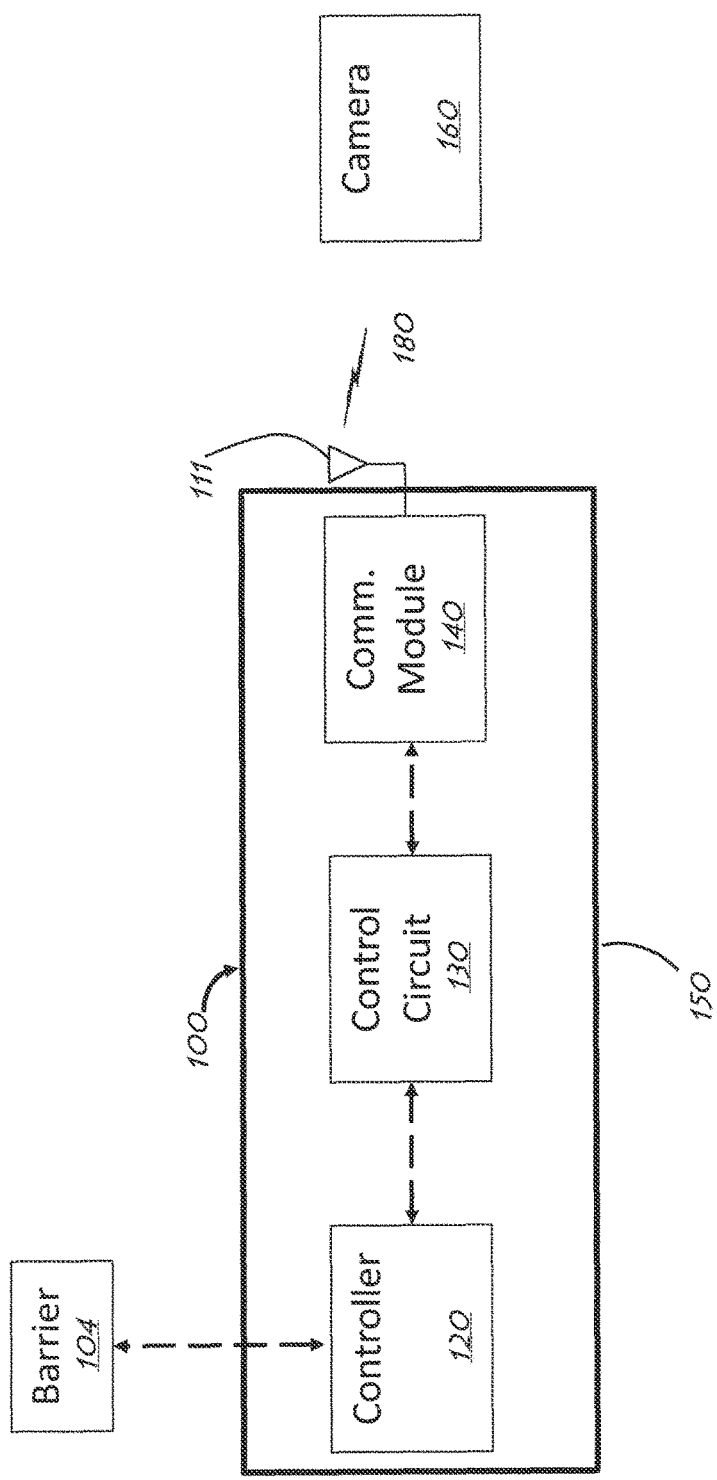
FIG. 4 is a block diagram showing a barrier operator in a wireless connection with an associated camera in accordance with at least one example of the present disclosure.
Figure 5:
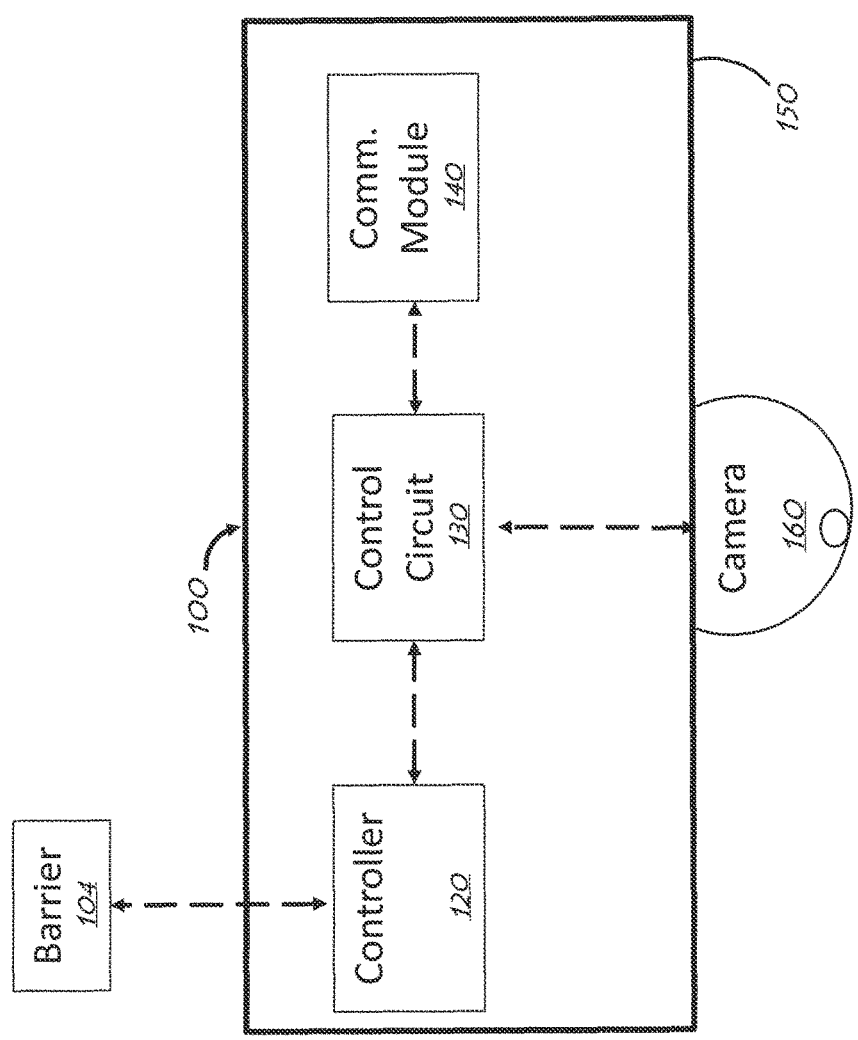
FIG. 5 is a block diagram showing a barrier operator with an associated camera attached to a housing in accordance with at least one example of the present disclosure.

Various barrier operator 100 and camera 160 configurations are shown in via the block diagrams of FIGS. 3-5. FIG. 3 shows an exemplary embodiment of a barrier operator system employing a camera 160 that is positioned exterior to the housing 150 of the barrier operator 100. Camera 160 is shown to be connected to the barrier operator 100, more specifically to the control circuit 130 of the barrier operator 100, via a cable 170 or wire. Via the cable 170, the control circuit 130 can transmit instructions that control operation of the camera 160. The cable 170 can also provide electrical power to the camera 160, however, the camera can also have its own electrical power source, for example, via a separate power adapter or battery. By another approach, power and communications can be provided to the camera 160 from the wall control wires (e.g., line 114) associated with the barrier operator 100.

FIG. 4 shows an exemplary embodiment of a barrier operator system where the camera 160 is remote to the housing 150 of the barrier operator 100 but still in communication with the barrier operator 100 via a wireless signal 180 transmitted from the antenna 111 of the communication module 140. Via the wireless signal 180, the control circuit 130 can transmit capture instructions that activate the camera 160 to capture one or more visual images, as well as other control instructions, as described above.

FIG. 5 shows an exemplary embodiment where the camera 160 is mounted to the housing 150 of the barrier operator 100. Similar to the embodiment depicted in FIG. 1, the camera of FIG. 5 is mounted on the exterior of the housing 150, and is therefore integrated as a part of the barrier operator 100. In this example, the control circuit 130 can be wired to communicate directly with the camera, for example, through connection circuitry or another wired or wireless connection.

The camera 160 can be arranged so that it captures visual images that include, for example, at least a portion of the barrier 104. To facilitate this, the barrier operator 100 can also be equipped to automatically activate a camera light source to facilitate capturing this image. So configured, this light source serves to illuminate the subject (such as the barrier) of the image to better facilitate capturing a usable image.

By one approach, this can comprise using a camera light source (such as a photographic flash component) dedicated to the described purpose. By another approach, in lieu of the foregoing or in combination therewith, the camera light source can comprise available lighting having other purposes as well. For example, in many cases a barrier operator will have corresponding work area light sources (either built in to the head unit or otherwise controlled by the head unit). The light itself can comprise light within the visible spectrum and/or other frequencies of light (such as infrared) that may be appropriate for use in a given application setting.

This camera 160 can include any of a wide variety of digital cameras (i.e., a camera that electronically captures the contents of a photographic field of view as a corresponding digitally-encoded representation). This includes both monochromatic cameras as well as full-color cameras. This also includes, as desired, still-image cameras as well as video cameras. By one approach the camera 160 can comprise a visible-light camera though cameras sensitive to other frequencies of light can be employed as desired.

By one approach, the visual images captured by the camera can include a single image corresponding to a single field of view. By another approach the image can comprise a plurality of separate images or a composite image (presenting, for example, multiple views (separated, perhaps, in time) of a shared field of view or a plurality of views representing different fields of view).

Generally speaking, the field of view captured by the camera 160 can be set by the person who installs the aforementioned component and/or by a subsequent end user. By one approach, if desired, this field of view can be made remotely adjustable (e.g., via so-called pan and tilt cameras) to permit post-installation adjustments in these regards. In another approach, the camera 160 can be adjustable via a user operated peripheral device 300. For example, the user operated peripheral device 300 can communicate with the barrier operator 100 to send control signals that adjust the pan, tilt, position, angle, orientation, or other arrangements of the camera 160.

In some approaches, the barrier operator 100 can include, or can be in communication with multiple cameras 160. For example, one camera can be integrated as a part of the housing 150, whereas other cameras can be mounted at locations exterior to the housing 150, such as on the ceiling or wall of a garage, for example. In this manner, the barrier operator 100, through the control circuit 130, can activate some or all of the cameras to capture images in certain situations, for example, when the controller is active to move the barrier between open and closed positions.

In operation, the barrier operator, via the control circuit 130, can control both the operation of the controller 120 to move of the barrier 104, and the camera 160 to capture visual images. For example, when the communication module 140 receives an open/close command from a peripheral device, the control circuit can (1) send an open/close instruction to the controller 120 that activates the controller 120 to move the barrier, and (2) send a capture instruction to the camera that activates the camera to capture visual images.

In some examples, the control circuit 130 can automatically send the open/close instruction to the controller 120 and the capture instruction to the camera 160 simultaneously or nearly simultaneously. In other examples, the control circuit can stagger the transmission of the signals, for example, so that the camera 160 begins capturing visual images a moment before (e.g., 1-3 seconds before) or a moment after (e.g., 1-3 seconds after) triggering the barrier 104 to move. Optionally, the command to capture video can be sent in response to receiving the open/close command and/or in response to determining whether to actually send a signal to effect movement of the barrier. For instance, the barrier operator may not open the barrier in response to receipt of a command to open if a vacation mode prevents operation, but receipt of the command would still trigger capturing video. In another approach, a user may not want to capture video images in that situation, and only when the barrier will actually move. In any event, the barrier operator is automatically triggering capture of the images based on the open/close command.

By one approach, the control circuit 130 can send capture instructions to the camera 160, and then send the captured visual images to a user operated peripheral device 300 before sending the open/close instruction to the controller 120. In this approach, a homeowner can elect to decline the ability to open the barrier based on the images presented. For example, where the image is received at 2 am, the homeowner may determine that the open/close request presents a security risk, and therefore decline the request.

By one approach, if the open/close command is received from an outdoor PIN pad, intercom device, or other peripheral device that is predetermined to suggest the presence of a visitor (e.g., a delivery person or hired service provider), the control circuit 130 may send capture instructions that direct the camera 160 to continue to capture visual images until the barrier 104 is closed again, (e.g., after the delivery has been made).

In some approaches, the open/close command received by the communication module 140 can be transmitted from a remote control or wall unit, such as those described with respect to FIGS. 1-2. In another approach, the open/close command can be generated in response to receiving a signal from a sensor, such as an alarm sensor that effects opening or closing a barrier when motion is detected within a certain location. Such an open/close command can then trigger the control circuit 130 to send a capture instruction to the camera 160.

In some aspects, the alarm sensor can be a sensor that is a part of an alarm or security system. For example, the alarm sensor can be a motion sensor, a glass break sensor, a door/window trip sensor, a heat sensor, or the like. In this manner, the barrier operator 100 and the related components can be a part of, or work in communication with such an alarm or security system.

The alarm sensor can also be an alarm system communication device such as an intercom unit, for example. Within the same alarm interaction system, status information from the barrier operator can be used to activate alarm system cameras. As an example, the communication module 140 can communicate with the alarm system in response to an obstacle detector associated with the barrier operator 100 detecting an obstacle (for example, by detecting an interruption in a photobeam). In response to receiving this communication, the barrier operator (via the control circuit 130) can generate and transmit a capture instruction to the alarm system, thereby activating one or more cameras of the alarm system to capture visual images. Accordingly, this technique allows multisystem use of the alarm system camera(s), so that visual images and other information can be captured from different perspectives in the event of detected high risk situations around a barrier, for example, a detected attempt to forcibly enter the garage.

Figure 6:
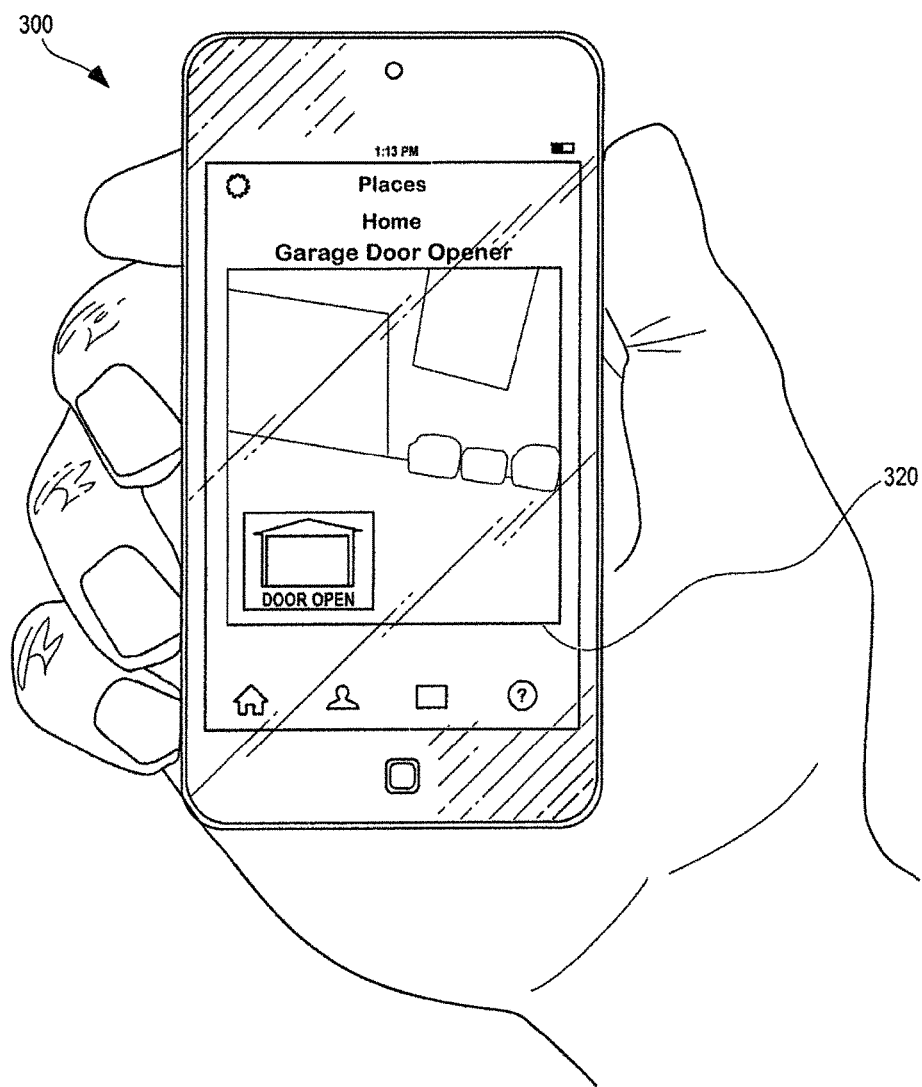
FIG. 6 shows an example of a user operated peripheral device providing a user interface displaying an image captured by a barrier operator controlled camera.

In other approaches, the open/close command can be transmitted from a user operated peripheral device 300, such as a mobile device operating a user interface that operates the barrier operator 100. FIG. 6 shows an example of such a mobile device 300 operating an interface 320. As shown, the interface 320 includes a visual image captured by the camera 160, as well as other graphics and controls. For example, the interface 320 can provide a status identifier indicating whether the barrier (or door) is in an open or closed position. The interface 320 can also provide information about the location of the camera (e.g., "home," "garage camera no. 1," "garage exterior camera," etc.).

In some aspects, the interface 320 can provide other information, such as the time and date of the images displayed on the interface, or the status of various sensors installed with respect to the barrier operator (e.g., carbon monoxide detector status, motion detector status, obstacle detector status, etc.)

In some examples, the interface 320 allows a user to control operation of various components of or associated with the barrier operator 100. For example, in some examples, the interface 320 can allow a user to open or close the barrier 104, to turn on a light in a garage, or to control a camera 160 associated with the barrier operator 100.

The camera controls can include, but are not necessarily limited to, the camera capturing visual images, the camera initiating recording of video and/or audio, the camera stopping recording of video and/or audio, capturing a series of still images (e.g., 15 still images), adjusting the pan, tilt, position, angle, or orientation of a camera and/or camera lens, adjusting the zoom setting of a camera and/or camera lens, adjusting the flash settings of the camera, adjusting the focus settings of the camera, adjusting the shutter speed of the camera, adjusting the image quality or pixel size of the captured image, or the like.

In one approach, the control circuit 130 identifies certain events with respect to the barrier operator 100, and then makes a determination as to whether to transmit the visual images to a peripheral device based on the identified events. For example, where the control circuit 130 detects that an open/close command was transmitted by a user operated peripheral device associated with the homeowner, the control circuit 130 may delete or otherwise not transmit the captured visual images.

So configured, detection of a condition of concern (e.g., open/closed commands received from particular peripheral devices, detected high temperatures, detected, smoke particles, carbon monoxide, or the like) can prompt the barrier operator to transmit a visual image of the present view of the barrier to one or more user operated peripheral devices associated with predetermined persons (such as the corresponding homeowner). Being apprised both of the condition of interest as well as the present position of the movable barrier, this person can then make a decision regarding whether the movable barrier should be moved at this time to a different position. That decision is then conveyed to the control circuit and a corresponding instruction transmitted to the barrier movement controller to cause the desired movement. Using this approach can alleviate concerns of making an inappropriate automated action regarding the barrier's position.

In other examples, the control circuit 130 may automatically transmit images, notifications, and/or other information when certain events are detected. For example, the control circuit 130 and communication module 140 can operate to transmit images, notifications, and/or other information, when events are detected pertaining to the receipt of an open/close command from a peripheral device associated with a particular identifier (e.g., a remote control in a child's car), the receipt of an open/close command during a particular window of time (e.g., between midnight and 6 am), a sensed attempt to forcibly open the barrier, a sensed obstacle in the path of a moving barrier, a sensed motion within a vicinity of the barrier operator (e.g., within the garage), a sensed barrier being in an open position for a period of time exceeding a minimum threshold (e.g., a garage door left open for more than 30 minutes), a detected temperature level, a detected smoke level, a detected carbon monoxide level, detected glass breaking (e.g., via sound sensors), and/or other events detected by sensors or other equipment associated with an alarm system, a security system, a surveillance system, or the like.

In these situations, the communication module 140 and control circuit 130 can operate to automatically transmit visual images captured by the camera, notifications, and/or other information to a user operated peripheral device. In such a situation, the barrier operator can be configured to await a prompt from a user operated peripheral device before allowing the barrier operator 100 to open the barrier. For example, the user operated peripheral device can be presented with an option to "okay" the movement of a barrier by sending an acknowledgement or other message back to the barrier operator, in response to receipt of which the barrier operator 100 (e.g., via the control circuit 130) can instruct the camera 160 to stop capturing visual images, erase the recently captured visual images, or perform other steps as desired.

In one approach, the barrier operator 100 can effect transmission of only selected images, rather than all visual images captured by the camera 160. For example, the selected images can include the first and fifth image in a series of images, or pre-selected stills from a video (such as stills at time markers 1, 3, and 5 seconds etc.). Further, the selected visual images can include portions of video footage captured by the camera 160, such as the first five, ten, or twenty seconds of video. By some approaches, the barrier operator 100 can effect transmission of visual images to or through an alarm or security system.

Several of the approaches described herein relate to using a barrier operator to effect activation of a camera in response to receiving open/close commands or otherwise making a determination to move (e.g., open or close) a barrier. That is, when the control circuit 130 makes a determination to activate a controller 120 to move a barrier 104, either by receiving an open/close command via a communication module 140, or by making an active decision to move the barrier based on other information provided from peripheral devices, the control circuit 130 effects the activation of a camera 160 to capture one or more visual images.

By one approach the control circuit 130 can send capture instructions to the camera 160 in response to detecting that the barrier operator's photobeam is or has become obstructed. Such a system would allow the barrier to be open but still allow capture of activity at the entrance of the garage.

By another approach, the control circuit 130 can also be configured to activate a camera 160 to capture visual images in response to the occurrence of other events. For example, the control circuit can be configured to activate the camera 160 in response to a light source affiliated with the barrier operator 100 turning on. In such an example, the barrier operator 100 may be equipped with a light source that is configured to activate, or turn on, in response to certain detected events. The detected events can be the movement of the barrier 104 itself, or events detected by sensors or other peripheral devices. For example the barrier operator 100 might include or be in communication with one or more motion sensors. The barrier operator 100, via the control circuit 130, could be configured to activate or turn on the associated light source (for example, a worklight) when the motion sensor detects motion.

In another example, the barrier operator 100, via the control circuit 130, could be configured to activate or turn on the associated light source in response to an obstacle detector sensing an obstacle. Thus, the barrier operator 100 could be configured to, in response to activating the light source for whatever reason (for example, every time a light turns on, or only when a light turns on in certain conditions (for example, only in response to a obstacle detector detecting an obstacle, or only in response to a motion detector detecting motion, etc.)), have the control circuit 130 automatically send a capture instruction to the camera 160.

This capture instruction can thereby activate the camera 160 to capture visual images. That is, in some examples, the control circuit 130 may automatically send the capture instruction whether or not the barrier itself is ultimately moving.

Additionally and/or alternatively a capture instruction can be generated directly from a detector that detects the activation of the barrier operator's light source to allow for a modular design for working with preinstalled operators. As an example, the camera can communicate wirelessly with a controller mounted to a garage ceiling with a sensor pointed towards the barrier operator light source. The sensor detects activation of the light source and responsively generates the capture instruction.

By other approaches, the control circuit 130 can also be configured to activate a camera 160 to capture visual images in response to the occurrence of other events. For example, the control circuit 130 can be configured to activate the camera 160 in response to the detection of certain radio signals being received by the communication module 140 (for example, in response to receiving a signal from a remote control device). In another example, the control circuit 130 can be configured to activate the camera 160 in response the detection of direct signals monitored between the controller 120 and the communication module 140.

Additionally and/or alternatively, the barrier operator 100 can include or be in communication with other sensors such as sound sensors (e.g., glass-break sensors), obstacle detectors, smoke detectors, carbon monoxide or carbon dioxide detectors, temperature sensors, forcible entry sensors, or the like. In response to receiving signals from these sensors that a particular event has occurred (e.g., detected glass breaking, detected objects in the path of a barrier, detected high levels of smoke, carbon monoxide, or carbon monoxide, detected extreme high or low temperatures, or detected forcible entry attempts on the barrier), the barrier operator 100 and/or the control circuit 130 may activate (e.g., turn on) the associated light source. In response to activating the light source, the control circuit 130 may automatically send a capture instruction to the camera 160. In still other examples, the control circuit 130 may automatically send capture instructions to the camera 160 in response receiving signals regarding the detection of one or more of these events regardless of whether or not the light source is activated.

Figure 7:
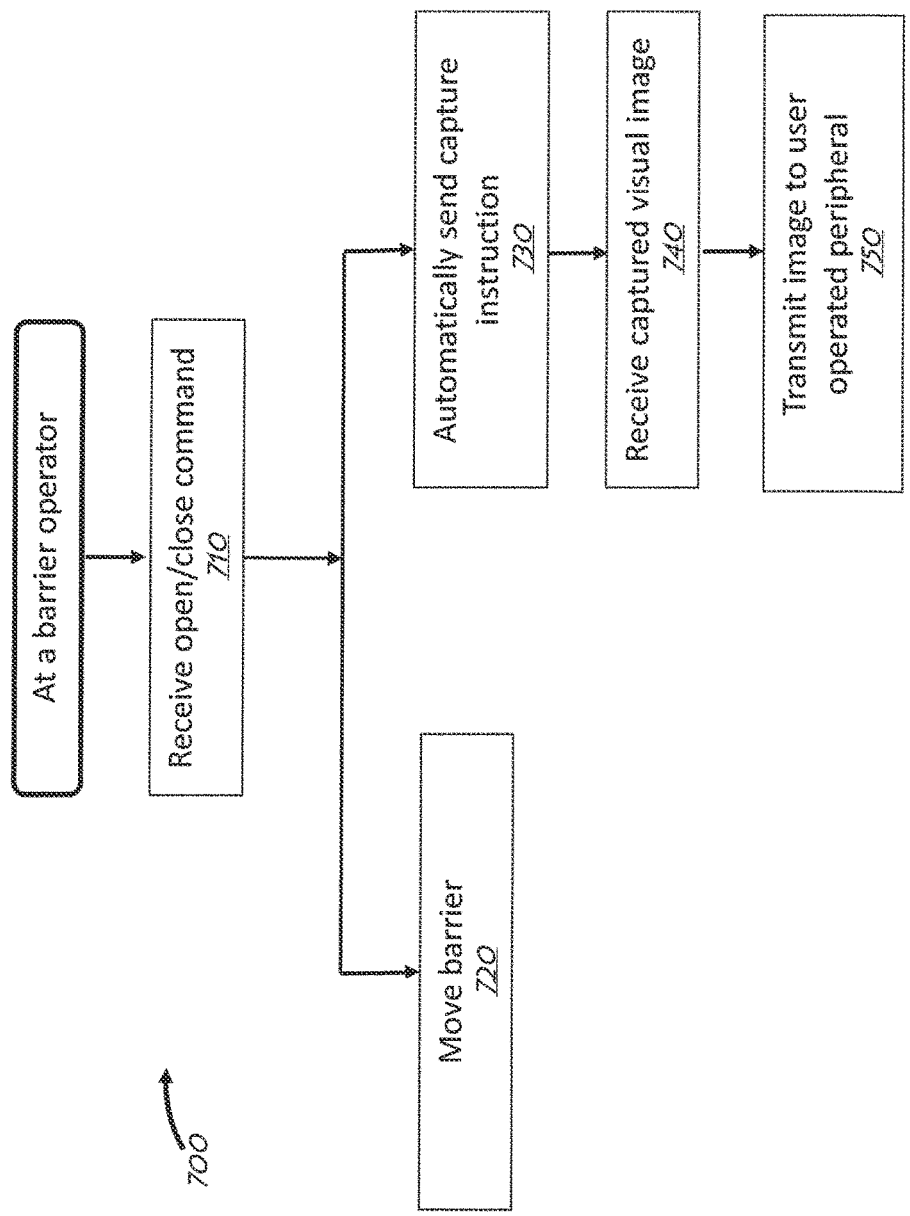
FIG. 7 is a flow diagram showing a method performed at a barrier operator in accordance with at least one example of the present disclosure.

The present disclosure also presents methods for operating a barrier operator to capture visual images with an associated camera. FIG. 7 is a flow diagram showing an example of a method 700 performed at a barrier operator. At step 710, the barrier operator receives an open/close command. This open/close command can be received from a peripheral device. For example, the open/close command can be a command sent from a wireless remote control device, a wall unit, or a user operated peripheral device (e.g. a smart phone) running an interface that operates the barrier operator. The open/close command can also be received in the form of a signal from a sensor, the signal configured to trigger activation of the barrier operator.

Next, at step 720, the barrier operator moves the barrier. For example, at step 720 a control circuit of the barrier operator can send an open/close instruction to a controller, and in response to receiving the instruction, the controller activates a motor that moves the barrier between open and closed positions. In some examples, at step 720, the barrier operator may also activate a light source. For example, in response to receiving a command to move the barrier or other signals predetermined to trigger activation of the light source, the barrier operator may turn on a light attached to, or otherwise associated with the barrier operator.

At step 730, the barrier operator sends a capture instruction to an associated camera. This step can be performed automatically, for example, in response to receiving the open/close command, or whenever the barrier operator is moving the barrier. The capture instructions can activate the associated camera to capture one or more visual images. In this manner, the camera can be activated to capture images any time that the barrier is moving.

At step 740, visual images captured by the camera are received by the barrier operator. The barrier operator can store the visual images locally in a storage device, for example, a local hard drive or flash memory device, or remotely, for example, in a storage device on a peripheral device or in a cloud storage account. Optionally, the images can be passed to such separate storage without passing through the barrier operator.

At step 750 the barrier operator effects transmission of images (either from itself or from a separate storage) to a user operated peripheral device, such as a smart phone. In some examples, the method 700 may delay step 720 until after step 750, or until a period of time after step 750 occurs. Step 750 can also include requesting permission from the user operated peripheral device to move the barrier. In this manner, the method 700 can allow a user to receive and view visual images and make a determination as to whether or not to allow the barrier operator to open the barrier.

In some examples, the barrier operator may only transmit the images in certain instances where certain events have been detected. For example, step 750 may include detecting the basis for the receipt of the open/close command. Where the open/close command was initiated by a user operated peripheral device that is associated with a particular identifier (e.g., the homeowner's smart phone), the method 700 may elect not to transmit any images.

Alternatively, when the open/close command is associated with an event of predetermined interest, step 750 may automatically transmit the captured visual images to a user operated peripheral device. For example, where it is detected that the open/close command is received from a peripheral device associated with a child's car, or from an outdoor PIN pad or intercom device (which can imply the presence of a visitor at the barrier)), step 750 can include automatically transmitting the visual images to the user operated peripheral device.

Step 750 may also automatically transmit images in situations that are predetermined to pose a heightened security risk whether or not associated with the open/close command. For example, automatic transmission can occur where the open/close command is received in a predetermined window of time (e.g., between midnight and 6 a.m.), or when a particular status is signaled by a sensor associated with a security system (e.g., where a forcible entry attempt is detected).

In some examples, step 750 can include transmitting images and/or other information directly or indirectly to an alarm system, a security system, a surveillance system, or the like. That is, in addition to, or instead of transmitting images and other information to a user operated peripheral device, step 750 can include transmitting the images and information to a home security system, and the security system may then, in turn, route or otherwise transmit the images and information to a user, for example, via a smart phone or similar device.

The security system may also route or transmit the images and information to another entity, such as a fire department, a police department, or a home monitoring company to expedite an appropriate response in emergency or other high risk situations.

In some examples, step 750 can also include transmitting other information to the user operated peripheral device. For example, step 750 can include transmitting information relating to the date, time, the status of the barrier (e.g., open, closed, partially open, etc.), the device that triggered the open/close command, and other sensor conditions detected at the time the visual image was captured.

By some approaches, step 750 can also include sending a notification to a user operated peripheral device before or concurrent with the transmission of the visual image. The notification can include some or all of the information referenced above relating to the captured image. In this manner, the user can choose to ignore the notification or elect to view the captured image based on the information that accompanies the notification.

This transmission can be carried out using any message-bearing mechanism of choice. By one approach, this can comprise forwarding the information via an extranet (such as, but not limited to, the internet). The control circuit's connection to this extranet can be direct or indirect (and via, for example, one or more intervening private and/or public networks) and wireless or non-wireless (in whole or in part). For many application settings this can comprise, for example, conveying the information within, or attached to, an email, a Short Message Service (SMS) message, a tweet (as effected via the Twitter service), an Instant Message (IM), or the like.

Although this disclosure discusses barrier operators, it is understood that those skilled in the art will appreciate that the same subject matter can be applied to accessory devices and other equipment that can supplement or communicate with such barrier operators. See for example U.S. patent application Ser. No. 13/671,602 filed Nov. 8, 2012, which application is incorporated by reference in its entirety herein.

Those skilled in the art will recognize that a wide variety of modifications, alterations, and combinations can be made with respect to the above described embodiments without departing from the scope of the invention as set forth in the claims, and that such modifications, alterations, and combinations are to be viewed as being within the ambit of the inventive concept. All references cited in the present disclosure are hereby incorporated by reference in their entirety.

What is claimed is:

1. A barrier operator apparatus that controls operation of a camera, the barrier operator apparatus comprising:
    a controller configured to move a barrier between open and closed positions;
    a communication module configured to receive communications from one or more peripheral devices, at least one communication comprising an open/close command; and
    control circuitry in communication with the controller, the communication module, and the camera, the control circuitry configured to send an open/close instruction to the controller that activates the controller to move the barrier, and to send a capture instruction to the camera that activates the camera to capture at least one visual image;
    wherein the control circuitry is configured to automatically send a capture instruction to the camera in response to at least one of:
    the communication module receiving an open/close command from a peripheral device,
    the control circuitry determining to activate a light source associated with the controller; or
    the control circuitry determining to send the open/close instruction to effect movement of the barrier,
    and wherein the control circuitry is configured to automatically send an open/close instruction to the controller in parallel with sending a capture instruction to the camera.

2. The apparatus of claim 1, wherein the camera is configured to capture still visual images and/or video visual images in response to receiving the capture instruction.

3. The apparatus of claim 1, wherein the control circuitry and communication module are configured to automatically transmit at least one visual image captured by the camera to a user operated peripheral device.

4. The apparatus of claim 3, wherein the control circuitry is configured to automatically effect transmission of at least one visual image captured by the camera to the user operated peripheral device in response to receiving information pertaining to an event that includes at least one of:
    an open/close command received from a peripheral device associated with a particular identifier;
    an open/close command received during a particular window of time;
    a sensed attempt to forcibly open the barrier;
    a sensed obstacle in a path of a moving barrier;
    a sensed motion within a vicinity of the barrier operator; and
    a sensed barrier being in an open position for a period of time exceeding a minimum threshold.

5. The apparatus of claim 4, wherein the control circuitry and communication module are configured to automatically transmit a notification to the user operated peripheral device in response to the information pertaining to an event, the notification comprising at least a portion of the information pertaining to the event.

6. The apparatus of claim 3, wherein the user operated peripheral device includes at least one of a smart phone, a computer, and a wall control unit with a visual display.

7. The apparatus of claim 3, wherein the control circuitry and communication module are configured to automatically send a notification to the user peripheral device in response to activation of the camera.

8. The apparatus of claim 3, wherein the communication module is configured to receive control commands from the user operated peripheral device, and
    wherein the control circuitry sends at least one control instruction to the camera in response to the receipt of a control command, the control instruction activating the camera to perform at least one camera function.

9. The apparatus of claim 8, wherein the camera function comprises at least one of the group consisting of:
    initiating the recording of video;
    stopping the recording of video;
    capturing one or more still images;
    adjusting the pan, tilt, position, or orientation of the camera;
    adjusting the zoom setting of the camera; and
    adjusting the focus of the camera.

10. The apparatus of claim 1 further comprising a housing, wherein the barrier operator, the communication module, and the control circuitry are located within the housing.

11. The apparatus of claim 10, further comprising the camera, which is integrated into the housing.

12. The apparatus of claim 10, wherein the camera is remote from the housing and is in wired or wireless communication with the communication module.

13. A barrier operator apparatus that controls operation of a camera, the barrier operator apparatus comprising:
    a camera operable to obtain visual images; and
    a housing comprising:
        a controller configured to move a barrier between open and closed positions;

a communication module configured to receive communications from one or more peripheral devices, at least one communication comprising an open/close command; and control circuitry in communication with the controller, the communication module, and the camera, the control circuitry configured to send an open/close instruction to the controller that activates the controller to move the barrier between open and closed positions, and to send a capture instruction to the camera that activates the camera to capture at least one visual image;

wherein the control circuitry is configured to automatically send a capture instruction to the camera in response to at least one of:

the communication module receiving an open/close command from a peripheral device, the control circuitry determining to activate a light source associated with the controller; or the control circuitry determining to send the open/close instruction to effect movement of the barrier, wherein the control circuitry is configured to automatically send an open/close instruction to the controller in parallel with sending a capture instruction to the camera, and wherein the control circuitry and communication module operate to automatically transmit at least one captured visual image captured in response to receiving the capture instruction to a user operated peripheral device.

14. The apparatus of claim 13, wherein the control circuitry is configured to automatically effect transmission of the at least one captured visual image to the user operated peripheral device in response to receiving information pertaining to an event that includes at least one of:

an open/close command received from a peripheral device associated with a particular identifier;

an open/close command received during a particular window of time;

a sensed attempt to forcibly open the barrier;

a sensed obstacle in a path of a moving barrier;

a sensed motion within a vicinity of the barrier operator; and a sensed barrier being in an open position for a period of time exceeding a minimum threshold.

15. The apparatus of claim 13, wherein the camera is integrated into the housing.

16. The apparatus of claim 13, further comprising a plurality of cameras, each camera being in communication with the control circuitry.

17. A method for operating a barrier operator to capture visual images with a camera, the barrier operator operable to move a barrier between open and closed positions, the method comprising:

receiving a communication comprising an open/close command at the barrier operator;

in response to receiving the communication comprising an open/close command:

effecting movement of the barrier between open and closed positions; and automatically sending a capture instruction from the barrier operator to a camera, the capture instruction activating the camera to capture at least one visual image, wherein the effecting movement of the barrier and the automatic sending of capture instructions occur in parallel.

18. The method of claim 17, further comprising transmitting the at least one captured visual image from the barrier operator to a user operated peripheral device.

19. The method of claim 17, further comprising receiving information pertaining to an event detected by a sensor.

20. The method of claim 19, further comprising automatically transmitting the at least one captured visual image to a user operated peripheral device in response to receiving information pertaining to the event that includes at least one of:

a command to open or close the barrier from a peripheral device associated with a particular identifier;

a command to open or close the barrier during a particular window of time;

a detected attempt to forcibly open the barrier;

a detected obstacle in a path of the barrier;

a detected motion within a vicinity of the barrier operator; and a barrier detected as being in an open position for a period of time exceeding a minimum threshold.

21. The method of claim 17, wherein the capture instruction is sent to the camera through an alarm system.

22. A method for operating a barrier operator to capture visual images with a camera, the barrier operator operable to move a barrier between open and closed positions, the method comprising:

receiving a communication comprising an open/close command at the barrier operator;

determining to send an open/close command to the barrier operator; and in response to determining to send the open/close command to the barrier operator, automatically sending a capture instruction from the barrier operator to a camera, the capture instruction activating the camera to capture at least one visual image, wherein the sending of an open/close command to the barrier and the automatic sending of capture instructions occur in parallel.

23. The method of claim 22, further comprising transmitting the at least one captured visual image from the barrier operator to a user operated peripheral device.

24. The method of claim 22, further comprising receiving information pertaining to an event detected by a sensor.

25. The method of claim 24, further comprising automatically transmitting the at least one captured visual image to a user operated peripheral device in response to receiving information pertaining to the event that includes at least one of:

a command to open or close the barrier from a peripheral device associated with a particular identifier;

a command to open or close the barrier during a particular window of time;

a detected attempt to forcibly open the barrier;

a detected obstacle in a path of the barrier;

a detected motion within a vicinity of the barrier operator; and a barrier detected as being in an open position for a period of time exceeding a minimum threshold.

26. A method for operating a barrier operator to capture visual images with a camera, the barrier operator operable to move a barrier between open and closed positions and to activate a light source associated with the barrier operator, the method comprising:

receiving a communication at the barrier operator;

determining to activate the light source associated with the barrier operator; and in response to the determining to activate the light source associated with the barrier operator, automatically sending a capture instruction from the barrier operator to a camera, the capture instruction activating the camera to capture at least one visual image, wherein the determining to activate the light source and the automatic sending of capture instructions occur in parallel.

27. The method of claim 26, wherein the communication received at the barrier operator is transmitted from an alarm system.

* * * * *